United States Patent
Huh et al.

(10) Patent No.: US 10,228,582 B2
(45) Date of Patent: Mar. 12, 2019

(54) CURVED DISPLAY DEVICE

(71) Applicant: Samsung Display Co., Ltd., Yongin-si, Gyeonggi-do (KR)

(72) Inventors: Su Jung Huh, Yongin-si (KR); Young Je Cho, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 306 days.

(21) Appl. No.: 15/203,567

(22) Filed: Jul. 6, 2016

(65) Prior Publication Data
US 2017/0059925 A1    Mar. 2, 2017

(30) Foreign Application Priority Data
Aug. 27, 2015    (KR) .................. 10-2015-0120687

(51) Int. Cl.
*G02F 1/1335*    (2006.01)
*B60K 37/04*    (2006.01)
*G02F 1/1333*    (2006.01)

(52) U.S. Cl.
CPC ........ *G02F 1/133512* (2013.01); *B60K 37/04* (2013.01); *B60K 2350/106* (2013.01); *B60K 2350/1028* (2013.01); *G02F 2001/133388* (2013.01)

(58) Field of Classification Search
CPC .................... G02F 1/133512; G02F 1/133305
See application file for complete search history.

(56) References Cited

U.S. PATENT DOCUMENTS

| | | |
|---|---|---|
| 2015/0022767 A1 | 1/2015 | Han et al. |
| 2015/0029449 A1 | 1/2015 | Woo et al. |
| 2015/0055042 A1 | 2/2015 | Chung et al. |

FOREIGN PATENT DOCUMENTS

| | | |
|---|---|---|
| JP | 2009-150982 A | 7/2009 |
| JP | 2010-243875 A | 10/2010 |
| KR | 10-2007-0025150 A | 3/2007 |

*Primary Examiner* — Thanh-Nhan P Nguyen
(74) *Attorney, Agent, or Firm* — Innovation Counsel LLP

(57) ABSTRACT

A curved display device includes a main display unit; a corner portion positioned at a corner of the main display unit; a first light blocking member positioned in the main display unit; and a second light blocking member positioned in the corner portion, wherein a first flat shape of the first light blocking member is different from a second flat shape of the second light blocking member.

18 Claims, 18 Drawing Sheets

: MDP
 : CP

CURVED DISPLAY DEVICE

RELATED APPLICATIONS

The present application claims priority to and the benefit of Korean Patent Application No. 10-2015-0120687 filed in the Korean Intellectual Property Office on Aug. 27, 2015, the disclosure of which is incorporated herein by reference in its entirety.

BACKGROUND

1. Field

The present disclosure relates generally to a curved display device. More particularly, the described technology relates generally to a curved display device having high contrast.

2. Description of the Related Art

Liquid crystal displays (LCDs) are one of the most widely used flat panel displays. An LCD includes a pair of panels including field-generating electrodes, such as pixel electrodes and a common electrode, and a liquid crystal (LC) layer interposed between the two panels. The LCD displays images by applying voltages to the field-generating electrodes to generate an electric field in the LC layer that determines the orientations of LC molecules therein to adjust polarization of incident light.

Recently, a display device such as a liquid crystal display specifically designed for an automotive application has been introduced. Vehicle interiors have numerous regions with curved surfaces. To apply a display device to conform to a curved surface, a process of bending a flat display device is required after manufacturing the flat display device.

In the process of bending a flat display device, stress acts on the substrate such that retardation is generated, which generates light leakage. In this case, as a curvature radius decreases, the stress increases, such that the amount of light leakage increases. As the light leakage increases, a black luminance increases, such that a contrast ratio (CR) decreases.

In the case of the display device designed for a vehicle, a high contrast ratio is required to correctly transmit information, even when driving at night.

The above information disclosed in this Background section is intended to enhance the understanding of the background information of the present disclosure, and therefore it may contain information that does not form a prior art that is already known to a person of ordinary skill in the art.

SUMMARY

The present disclosure provides a curved display device with high contrast.

A curved display device according to an exemplary embodiment includes a main display unit; a corner portion positioned at a corner of the main display unit; a first light blocking member positioned in the main display unit; and a second light blocking member positioned in the corner portion, wherein a first flat shape of the first light blocking member is different from a second flat shape of the second light blocking member.

The second flat shape of the corner portion is formed as at least one of a triangle, a quadrangle, a polygon, and an arc shape.

A boundary between the main display unit and the corner portion may be made of a straight line, a curved line, and a step shape.

The curved display device may be formed as a quadrangle and include four corner portions.

The main display unit and the corner portions may respectively include a plurality of pixels, and each pixel of the plurality of pixels may include an opening region.

The first light blocking member and the second light blocking member may enclose the opening region.

The first light blocking member may be positioned at an edge of the pixel of the main display unit.

The second light blocking member may be positioned at the edge and inside a pixel of the corner portion.

A first area ratio of the second light blocking member in the corner portion may be higher than a second area ratio of the first light blocking member in the main display unit.

A first area ratio of the opening region in the corner portion may be lower than a second area ratio of the opening region in the main display unit.

A shape of the opening region in the corner portion may be formed as at least one among a triangle, a quadrangle, a polygon, a circle, an oval, and a shape including a straight line and a curved line.

The opening region in the corner portion may be positioned at a center portion of the pixel or adjacent to one edge of the pixel.

A first shape, the position, and the area of the second light blocking member may be determined by a second shape, the position, and the area of a region generating light leakage.

The corner portion may include a first corner portion adjacent to the main display unit, a second corner portion positioned outside the first corner portion, and a third corner portion positioned outside the second corner portion.

A first area ratio of the second light blocking member in the first corner portion may be lower than a second area ratio of the second light blocking member in the second corner portion.

A first area ratio of the second light blocking member in the second corner portion may be lower than a second area ratio of the second light blocking member in the third corner portion.

An area ratio of the second light blocking member in the corner portion may be different depending on its position.

An area ratio of the second light blocking member may increase farther from a boundary between the corner portion and the main display unit in the corner portion.

The curved display device may be used as a vehicle display device. The curved display device may have a curvature to conform to an interior surface of the vehicle.

The curved display device may be used as a vehicle instrument panel on a dashboard or a vehicle center console information display unit.

The curved display device according to an exemplary embodiment has the following effects.

The curved display device according to an exemplary embodiment differentiates flat shapes of the light blocking member of the main display unit and the light blocking member of a corner portion, thereby improving a contrast ratio.

DETAILED DESCRIPTION

Figure 1:
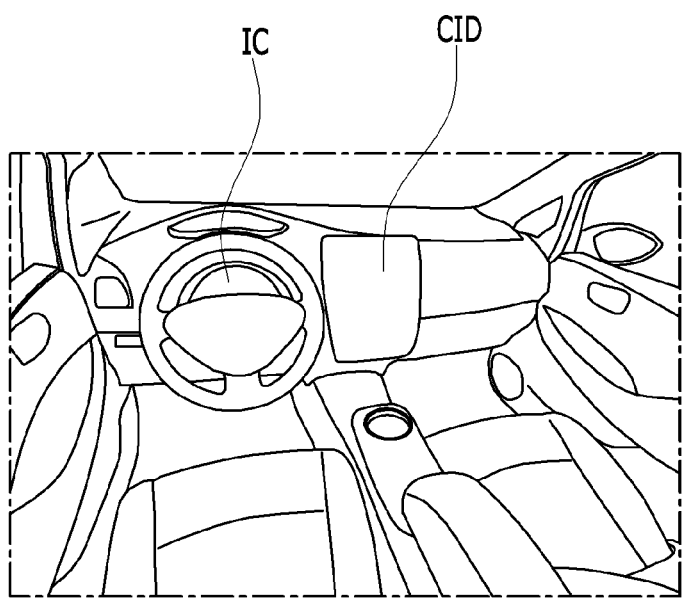
FIG. 1 is a view showing a vehicle interior applied with a curved display device, according to an exemplary embodiment.

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the another element or one or more intervening elements may also be present. In contrast, when an element is referred to as being "directly on" another element, there may be no intervening elements present.

First, a vehicle interior including a curved display device, according to an exemplary embodiment, will be described with reference to FIG. 1. FIG. 1 is a view showing a vehicle interior including a curved display device, according to an exemplary embodiment. A vehicle instrument panel (also referred to as instrument cluster (IC)) on a dashboard is positioned in front of a driver's seat inside a vehicle. A vehicle center information display (CID) unit is positioned in the center console between the driver's seat and passenger seat.

The vehicle instrument panel displays a current status of the vehicle including, but not limited to, a battery warning light, an engine oil warning light, a high beam indicator light, turn signal indicator lights, a fuel level warning light, a tachometer, a seat belt warning light, a speedometer, a driving odometer, a driving recorder, a fuel system, a cooling water thermometer, a door open warning light, etc. The vehicle center information display (CID) unit displays other information or additional functions of the vehicle. In addition, to control the additional function through touch, the vehicle center information display (CID) unit may be a touch panel. The vehicle center information display (CID) unit may display navigation, a rear camera, audio, video, air conditioning, and the like.

The vehicle display device used as the vehicle instrument panel or the vehicle center information display (CID) unit is attached to a vehicle dashboard, and the front surface of the dash board may be a curved surface. Accordingly, the vehicle display device may have a curved shape to conform to the curved surface of the dash board.

The vehicle display device may be made of a display device having a curved shape. For example, the vehicle display device may be made of a curved liquid crystal display, or a curved organic light emitting device.

The curved display device according to an exemplary embodiment may be used as a vehicle instrument panel or a vehicle center information display (CID) unit, but the present disclosure is not limited thereto. The curved display device according to an exemplary embodiment may be used as various vehicle display devices, such as a passenger seat display device, a rear seat display device, and the like. In addition, the vehicle instrument panel and the vehicle center information display (CID) unit may be connected to each other, thereby forming a single curved display device.

Figure 2:
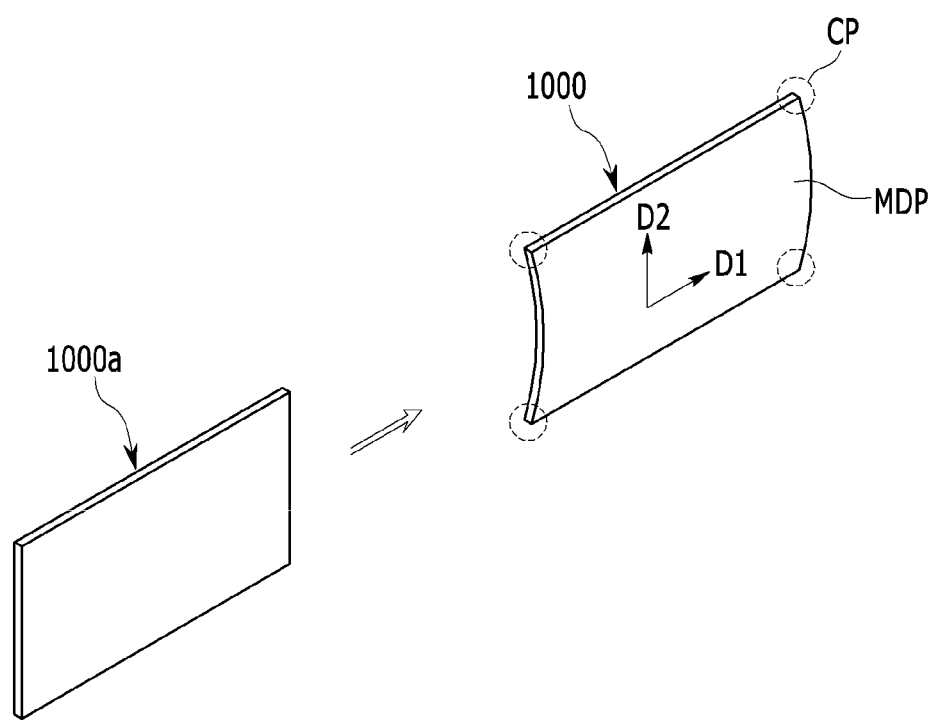
FIG. 2 is a perspective view showing a process for forming a curved display device, according to an exemplary embodiment.

Next, a schematic shape of the curved display device, according to an exemplary embodiment, will be described with reference to FIG. 2. FIG. 2 is a perspective view showing a process for forming a curved display device, according to an exemplary embodiment. The curved display device 1000 is formed by manufacturing a flat display device 1000a and bending the flat display device 1000a to be curved. The curved display device 1000 has a predetermined curvature. The curved display device 1000 has a shape bent along a second direction D2 by using a first direction D1 as an axis. The first direction D1 may be a horizontal direction, and the second direction D2 may be a vertical direction.

The curved display device 1000 may be substantially a quadrangle and includes a main display unit MDP positioned at the center and a corner portion CP positioned at a corner of the main display unit MDP. When the curved display device 1000 is formed as a quadrangle, four corner portions CP may be included. However, the present disclosure is not limited thereto, and the shape of the curved display device 1000 and the number of corner portions CP may be variously changed.

Depending on the usage of the curved display device 1000, the main display unit MDP may require high transmittance. The corner portion CP having less utilization as a display area may not have high transmittance.

In the process of bending the flat display device 1000a, a bending stress acts on the substrate. Accordingly, retardation may be generated in the corner portion CP of the curved display device 1000 by the bending stress. In the curved display device 1000, by differentiating the arrangement of light blocking member of the corner portion CP from other regions, light leakage due to retardation may be prevented from being generated.

Next, the shape of the corner portion CP of the curved display device according to an exemplary embodiment and the shape of the boundary between the main display unit MDP and the corner portion CP will be described with reference to FIG. 3 to FIG. 6. FIG. 3 to FIG. 6 are top plan views showing a corner portion and a main display unit adjacent to the corner portion in a curved display device according to various exemplary embodiments.

Figure 3:
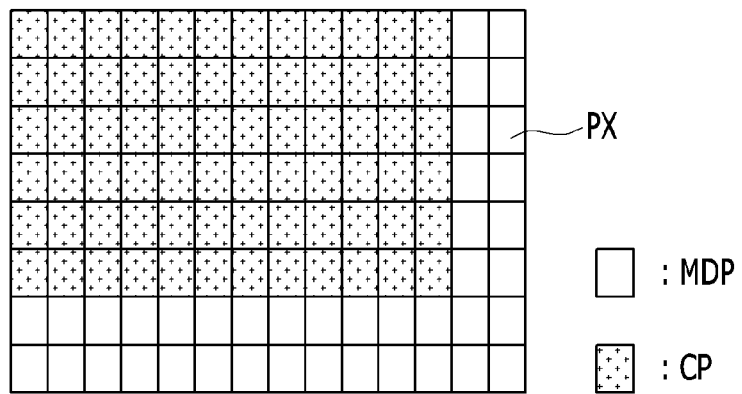
FIG. 3, FIG. 4, FIG. 5 and FIG. 6 are top plan views showing a corner portion and a main display unit adjacent to the corner portion in a curved display device, according to various exemplary embodiments.

As shown in FIG. 3, both the main display unit MDP and the corner portion CP of the curved display device include a plurality of pixels. For example, the plurality of pixels may include a red pixel, a green pixel, and a blue pixel. The magnitude of the electric field applied between the pixel electrode and the common electrode is controlled depending on the on/off state of the thin film transistor to control the luminance for each pixel. A predetermined image may be displayed through the control of the luminance for the plurality of pixels. In some embodiment, the colors of the plurality of pixels include red, green, and blue. In other embodiment, the colors of the plurality of pixels include cyan, magenta, and yellow, and a white pixel may be further included to improve transmittance.

The flat shape of the corner portion CP of the curved display device according to an exemplary embodiment may be formed as a quadrangle. In this case, the main display unit MDP may correspond to the region other than the corner portion CP within the display region of the curved display device. In this case, the boundary between the main display unit MDP and the corner portion CP may be a straight line.

Figure 4:
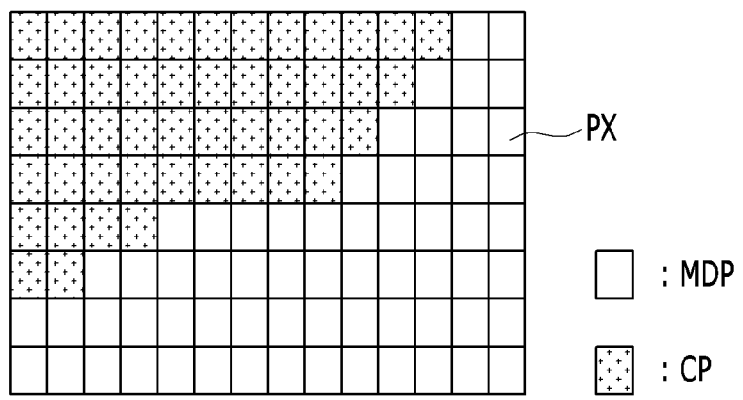

As shown in FIG. 4, the flat shape of the corner portion CP of the curved display device according to an exemplary embodiment may be formed as a polygon. In this case, the main display unit MDP may correspond to the region other than the corner portion CP within the display region of the curved display device. In this case, the boundary between the main display unit MDP and the corner portion CP may be a step shape.

Figure 5:
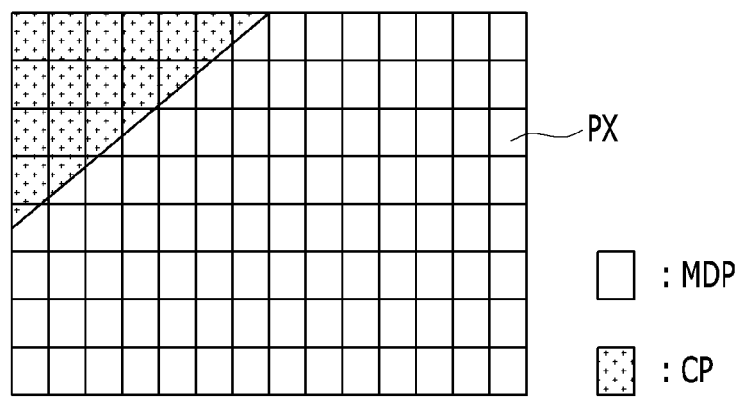

As shown in FIG. 5, the flat shape of the corner portion CP of the curved display device according to an exemplary embodiment may be formed as a triangle. In this case, the main display unit MDP may correspond to the region other than the corner portion CP within the display region of the curved display device. In this case, the boundary between the main display unit MDP and the corner portion CP may be a straight line.

In the exemplary embodiments of FIG. 3 and FIG. 4, the pixels of the main display unit MDP and the pixels of the corner portion CP are individually divided. Alternatively, in the exemplary embodiment of FIG. 5, pixels positioned at the boundary between the main display unit MDP and the corner portion CP have a portion included in the main display unit MDP and the rest of the portion included in the corner portion CP.

Figure 6:
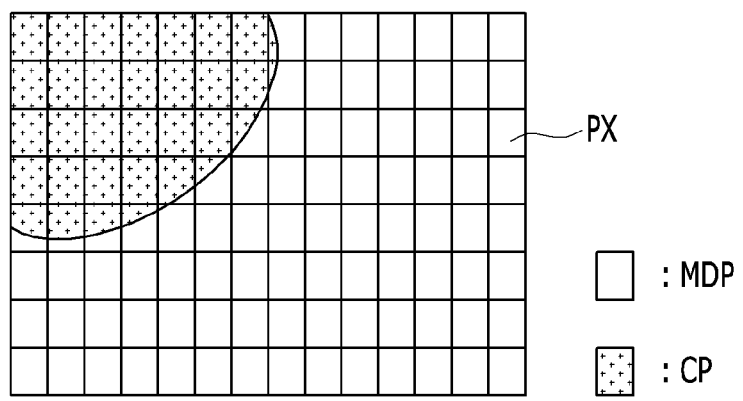

As shown in FIG. 6, the flat shape of the corner portion CP of the curved display device according to an exemplary embodiment may be an arc shape. In this case, the main display unit MDP may correspond to the region other than the corner portion CP within the entire region of the curved display device. In this case, the boundary between the main display unit MDP and the corner portion CP may be a curved line.

As described above, the flat shape of the corner portion CP of the curved display device according to an exemplary embodiment may be formed of various shapes, and thus the shape of the boundary between the main display unit MDP and the corner portion CP may vary. In addition, the pixel of the main display unit MDP and the pixel of the corner portion CP may be independent, and in the case of a partial pixel, the main display unit MDP and the corner portion CP may share the same pixel.

Next, the pixel PX of the main display unit MDP and the pixel PX of the corner portion CP in the curved display device according to an exemplary embodiment will be described with reference to FIG. 7 to FIG. 14.

Figure 7:
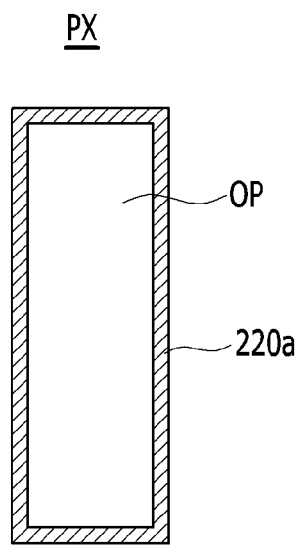
FIG. 7 is a top plan view of one pixel of a main display unit of a curved display device, according to an exemplary embodiment.

FIG. 7 is a top plan view of one pixel of a main display unit of a curved display device according to an exemplary embodiment, and FIG. 8 to FIG. 14 are top plan views of one pixel of a corner portion of a curved display device according to various exemplary embodiments.

As shown in FIG. 7, a pixel PX of the main display unit MDP of the curved display device includes an opening region OP to pass light. The curved display device controls the intensity of light passing through the opening region OP of each pixel PX, thereby displaying an image. A first light blocking member 220a is positioned in the main display unit MDP. The first light blocking member 220a may have a shape that encloses the opening region OP. The first light blocking member 220a is formed on the edge of each pixel PX, thereby preventing light leakage in the region where the gate line, the data line, the thin film transistor are formed. The first light blocking member 220a may be positioned on the boundary between adjacent pixels PX.

In FIG. 7, the first light blocking member 220a encloses the entire edge of the pixel PX. However, the present disclosure is not limited thereto, and the position and the shape of the first light blocking member 220a may be variously changed. For example, the first light blocking member 220a may be formed on a partial edge of the pixel PX and may be further formed in a portion of the center region of the pixel PX.

Figure 8:
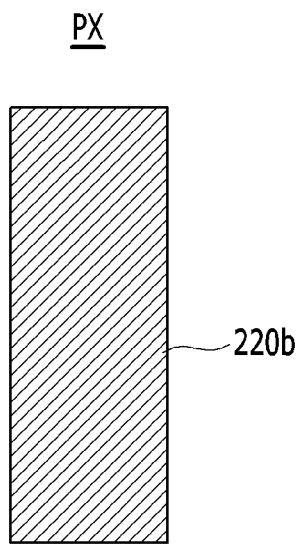
FIG. 8, FIG. 9, FIG. 10, FIG. 11, FIG. 12, FIG. 13 and FIG. 14 are top plan views of one pixel of a corner portion of a curved display device, according to various exemplary embodiments.

As shown in FIG. 8, a pixel PX of the corner portion CP of the curved display device may not include an opening region to pass light. A second light blocking member 220b is positioned in the corner portion CP. The second light blocking member 220b is formed on the entire region of the pixel PX so that light cannot pass at all. As described above, a bending stress largely acts on a corner portion CP of the curved display device such that retardation may be generated, thereby generating light leakage. In the present exemplary embodiment, the second light blocking member 220b formed in the entire region of each pixel PX of the corner portion CP prevents light leakage.

In curved display devices used for vehicles, the corner portion CP may not actually display an image, thus high transmittance may not be required. Accordingly, the second light blocking member 220b covering the entire region in each pixel PX of the corner portion CP prevents light leakage and improved a contrast ratio.

Figure 9:
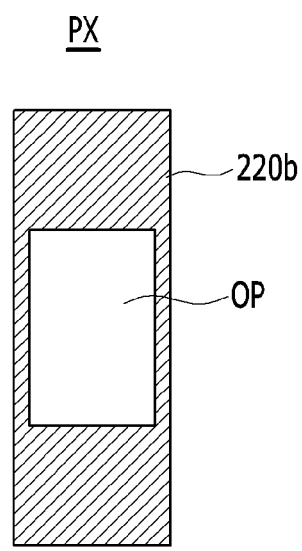

As shown in FIG. 9, a pixel PX of the corner portion CP of the curved display device includes an opening region OP to pass light. The opening region OP may be formed as a quadrangle. The opening region OP is positioned at the center of the pixel PX. The second light blocking member 220b is positioned in the corner portion CP. The second light blocking member 220b may have a shape that encloses the opening region OP. The second light blocking member 220b is formed on the edge of each pixel PX and is formed inside the pixel PX. The second light blocking member 220b is positioned in the upper region and the lower region of the opening region OP.

Figure 10:
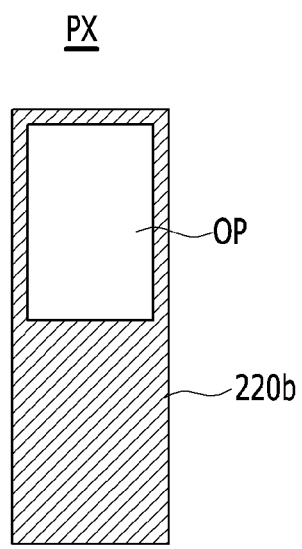

As shown in FIG. 10, a pixel PX of the corner portion CP of the curved display device includes an opening region OP to pass light. The opening region OP may be formed as a rectangle. The opening region OP may be positioned to be adjacent to the upper side edge of the pixel PX. However, the present disclosure is not limited thereto, and the opening region OP may be positioned to be adjacent to the lower side edge of the pixel PX. The second light blocking member 220b is positioned in the corner portion CP. The second light blocking member 220b may have a shape that encloses the opening region OP. The second light blocking member 220b is formed at the edge of each pixel PX and is formed inside each pixel PX. Most of the second light blocking member 220b is positioned at the lower region of the opening region OP.

Figure 11:
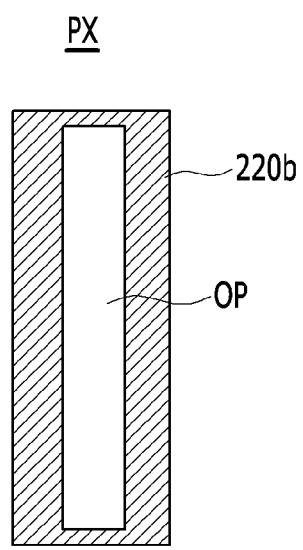

As shown in FIG. 11, a pixel PX of the corner portion CP of the curved display device includes an opening region OP. The opening region OP may be formed as a rectangle. The opening region OP is positioned at the center portion of the pixel PX. The second light blocking member 220b is positioned in the corner portion CP. The second light blocking member 220b may have a shape that encloses the opening region OP. The second light blocking member 220b is formed at the edge of each pixel PX and is formed inside each pixel PX. The second light blocking member 220b is positioned in the left region and the right region of the opening region OP.

Figure 12:
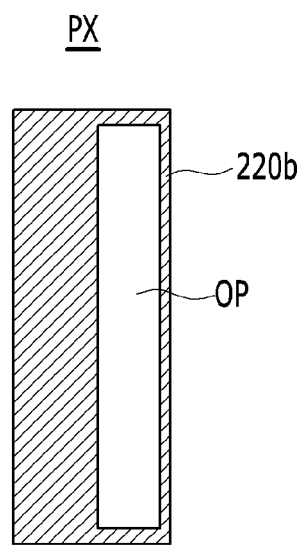

As shown in FIG. 12, a pixel PX of the corner portion CP of the curved display device includes the opening region OP to pass light. The opening region OP may be formed as a rectangle. The opening region OP may be positioned to be adjacent to the right edge of the pixel PX. However, the present disclosure is not limited thereto, and the opening region OP may be positioned to be adjacent to the left edge of the pixel PX. The second light blocking member 220b is positioned at the corner portion CP. The second light blocking member 220b may have a shape that encloses the opening region OP. The second light blocking member 220b is formed at the edge of each pixel PX and is formed inside each pixel PX. Most of the second light blocking member 220b is positioned in the left region of the opening region OP.

Figure 13:
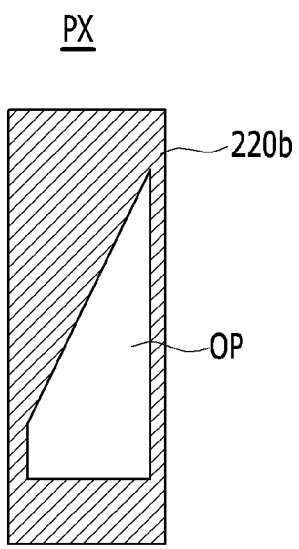

As shown in FIG. 13, a pixel PX of the corner portion CP of the curved display device includes an opening region OP to pass light. The opening region OP may be formed as a trapezoid. The trapezoid may include two sides parallel to one edge of the pixel PX, one side parallel to another edge of the pixel PX, and one side that is oblique to the edge of the pixel PX. The opening region OP may be positioned to be adjacent to the lower edge of the pixel PX. The second light blocking member 220b is positioned at the corner portion CP. The second light blocking member 220b may have a shape that encloses the opening region OP. The second light blocking member 220b is formed at the edge of each pixel PX and is formed inside each pixel PX. Most of the second light blocking member 220b is positioned in the upper region of the opening region OP.

Figure 14:
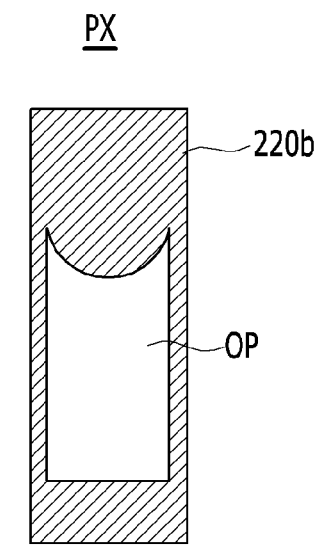

As shown in FIG. 14, a pixel PX of the center portion CP of the curved display device includes an opening region OP to pass light. The opening region OP may be formed in a shape that includes a straight line and a curved line.

The second light blocking member 220b is positioned in the corner portion CP. The second light blocking member 220b may have a shape that encloses the opening region OP. The second light blocking member 220b is formed at the edge of each pixel PX and is formed inside each pixel PX. Most of the second light blocking member 220b is positioned in the upper region of the opening region OP.

As shown in FIG. 8 to FIG. 14, the shape of the opening region OP in the corner portion CP may vary. For example, the opening region OP may be formed as a triangle, a quadrangle, a polygon, a circle, an oval, and the like. In addition, the shape of the opening region OP is not limited thereto and may be variously changed. The shape of the opening region OP that is not covered by the second light blocking member 220b may be changed depending on the shape of the second light blocking member 220b. The shape of the opening region OP of each pixel PX may be formed differently.

In the corner portion CP, the opening region OP may be positioned at the center of each pixel PX and may be adjacent to one edge of the pixel PX. Further, the position of the opening region OP may vary for each pixel PX.

In the corner portion CP, an area ratio of the opening region OP over the entire area of each pixel PX may vary. For example, in the exemplary embodiment shown in FIG. 8, the area ratio of the opening region OP for the pixel PX is 0%, whereas in the exemplary embodiments shown in FIG. 9 to FIG. 13, the area ratio of the opening region OP over the area of the pixel PX is about 50%. The area ratio of the opening region OP for each pixel PX may differ.

The selected area ratio of the opening region OP for the pixel PX in the main display unit MDP and the area ratio of the opening region OP for the pixel PX in the corner portion CP may be appropriately between about 0% to about 100%. In this case, the area ratio of the opening region OP for the pixel PX in corner portion CP is lower than the area ratio of the opening region OP for the pixel PX in the main display unit MDP. Accordingly, the area ratio of the second light blocking member 220b for the pixel PX in the corner portion CP is higher than the area ratio of the first light blocking member 220a for the pixel PX in the main display unit MDP. Since high transmittance is not required in the corner portion CP and prevention of light leakage due to a bending stress is necessary, the ratio of the light blocking area of the corner portion CP may be relatively high compared to the ratio of the light blocking area of the main display unit MDP.

The shape, position, and area of the second light blocking member 220b in the corner portion CP of the curved display device according to an exemplary embodiment may be determined depending on the shape, position, and area of a light leakage generation region. The amount of retardation generated changes depending on a curvature radius of the curved display device. In addition, the amount of retardation differs depending on the position in the corner portion CP. For example, the amount of retardation generated in the corner portion CP may be relatively large, whereas the amount of retardation generated in other regions may be relatively small. The degree of light leakage changes depending the amount of retardation generated, and the shape, position, and area of the second light blocking member 220b for each region may be designed in consideration of the amount of retardation.

Figure 15:
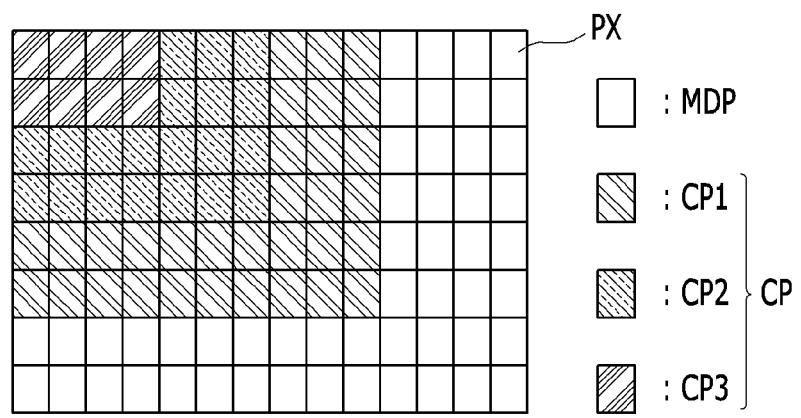
FIG. 15 is a top plan view showing a corner portion and a main display unit adjacent to the corner portion in a curved display device, according to various exemplary embodiments.
Figure 16:
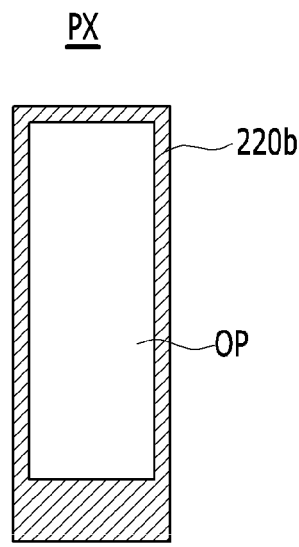
FIG. 16 is a top plan view showing a pixel of a first corner portion of a curved display device, according to an exemplary embodiment.
Figure 17:
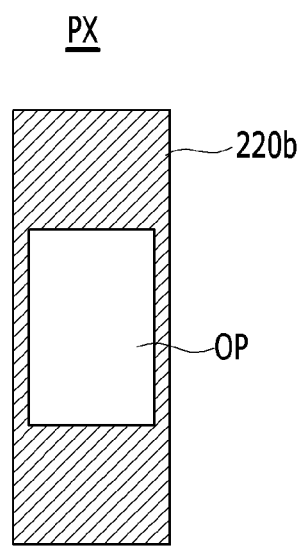
FIG. 17 is a top plan view of a pixel of a second corner portion of a curved display device, according to an exemplary embodiment.
Figure 18:
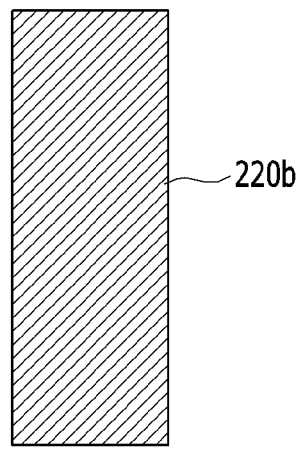
FIG. 18 is a top plan view of a pixel of a third corner portion of a curved display device, according to an exemplary embodiment.

Next, a case in which the area of the second light blocking member 220b is designed differently by dividing the corner portion CP of the curved display device into a plurality of regions will be described with reference to FIG. 15 to FIG. 18. FIG. 15 is a top plan view showing a corner portion and a main display unit adjacent to the corner portion in a curved display device, according to various exemplary embodiments. FIG. 16 is a top plan view showing a pixel of a first corner portion of a curved display device, according to an exemplary embodiment. FIG. 17 is a top plan view of a pixel of a second corner portion of a curved display device, according to an exemplary embodiment. FIG. 18 is a top plan view of a pixel of a third corner portion of a curved display device, according to an exemplary embodiment.

As shown in FIG. 15, the curved display device includes the main display unit MDP and the corner portion CP. The corner portion CP includes a first corner portion CP1, a second corner portion CP2, and a third corner portion CP3. The first corner portion CP1 is positioned adjacent to the main display unit MDP, the second corner portion CP2 is positioned outside the first corner portion CP1, and the third corner portion CP3 is positioned outside the second corner portion CP2. The second corner portion CP2 is positioned between the first corner portion CP1 and the third corner portion CP3.

As shown in FIG. 16, one pixel PX of the first corner portion CP1 of the curved display device includes an opening region OP to pass light. The second light blocking member 220b may have a shape that encloses the opening region OP. In the first corner portion CP1, the area ratio of the second light blocking member 220b for the pixel PX may be about 10%.

As shown in FIG. 17, a pixel PX of the second corner portion CP2 of the curved display device includes an opening region OP to pass light. The second light blocking member 220b may have a shape that encloses the opening region OP. In the second corner portion CP2, the area ratio of the second light blocking member 220b for the pixel PX may be about 50%.

As shown in FIG. 18, a pixel of the third corner portion CP3 of the curved display device may not include an opening region. The second light blocking member 220b may be formed on the entire region of the pixel PX. In the third corner portion CP3, the area ratio of the second light blocking member 220b for the pixel PX may be about 100%.

Referring to FIG. 15 to FIG. 18, the area ratio of the second light blocking member 220b for the pixel PX in the first corner portion CP1 is lower than the area ratio of the second light blocking member 220b for the pixel PX in the second corner portion CP2. Further, the area ratio of the second light blocking member 220b for the pixel PX in the second corner portion CP2 is lower than the area ratio of the second light blocking member 220b for the pixel PX in the third corner portion CP3. That is, in the corner portion CP, the area ratio of the second light blocking member 220b for the pixel PX may be different depending on each region. In this case, in the corner portion CP, the area ratio of the second light blocking member 220b for the pixel PX may increase farther from the boundary between the corner portion CP and the main display unit MDP. As the bending stress in the center portion CP increases farther from the main display unit MDP, the generation of light leakage increases such that the area ratio of the light blocking area may be designed to higher for the pixels farther from the main display unit MDP.

It is understood that the embodiments described above with reference to the drawings are exemplary embodiment, and various design changes are possible by dividing the region where the bending stress is relatively large and the region where the stress is relatively small depending on the curvature of the curved display device. In addition, in the corner portion of the curved display device, the shape, position, and area of the second light blocking member may be the same. Further, the second light blocking member may be formed on the entire corner portion of the curved display device.

While the present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the present disclosure.

DESCRIPTION OF SYMBOLS

CP: corner portion
CP1: first corner portion
CP2: second corner portion
CP3: third corner portion
OP: opening region
PX: pixel
220a: first light blocking member
220b: second light blocking member

What is claimed is:

1. A curved display device comprising:
a main display unit;
a center portion positioned at a center of the main display unit
a corner portion positioned at a corner of the main display unit;
a first light blocking member positioned in the center portion; and
a second light blocking member positioned in the corner portion,
wherein a first flat shape of the first light blocking member is different from a second flat shape of the second light blocking member,
wherein the center portion and the corner portion respectively include a plurality of pixels, and each pixel of the plurality of pixels includes an opening region, and
wherein the first light blocking member and the second light blocking member enclose the opening region.

2. The curved display device of claim 1, wherein:
the second flat shape of the corner portion is formed as at least one of a triangle, a quadrangle, a polygon, and an arc shape.

3. The curved display device of claim 1, wherein:
a boundary between the center portion and the corner portion is formed as a straight line, a curved line, and a step shape.

4. The curved display device of claim 1, wherein:
the curved display device is formed as a quadrangle and includes four corner portions.

5. The curved display device of claim 1, wherein:
the first light blocking member is positioned at an edge of the pixel of the center portion.

6. The curved display device of claim 5, wherein:
the second light blocking member is positioned at the edge and inside a pixel of the corner portion.

7. The curved display device of claim 1, wherein:
a first area ratio of the second light blocking member in the corner portion is higher than a second area ratio of the first light blocking member in the center portion.

8. The curved display device of claim 1, wherein:
a first area ratio of the opening region in the corner portion is lower than a second area ratio of the opening region in the center portion.

9. The curved display device of claim 1, wherein:
a shape of the opening region in the corner portion is formed as at least one of a triangle, a quadrangle, a polygon, a circle, an oval, and a shape that includes a straight line and a curved line.

10. The curved display device of claim 1, wherein:
the opening region in the corner portion is positioned at a center of the pixel or is adjacent to one edge of the pixel.

11. The curved display device of claim 1, wherein:
a first shape, position, and area of the second light blocking member are determined by a second shape, position, and area of a region generating light leakage.

12. The curved display device of claim 1, wherein:
the corner portion includes:
a first corner portion that is adjacent to the center portion,
a second corner portion positioned outside the first corner portion, and a third corner portion positioned outside the second corner portion.

13. The curved display device of claim 12, wherein:
a first area ratio of the second light blocking member in the first corner portion is lower than a second area ratio of the second light blocking member in the second corner portion.

14. The curved display device of claim 13, wherein:
a first area ratio of the second light blocking member in the second corner portion is lower than a second area ratio of the second light blocking member in the third corner portion.

15. The curved display device of claim 1, wherein:
an area ratio of the second light blocking member in the corner portion is different depending on its position.

16. The curved display device of claim 15, wherein:
an area ratio of the second light blocking member in the corner portion increases farther from a boundary between the corner portion and the center portion.

17. The curved display device of claim 1, wherein:
the curved display device has a curvature to conform to an interior surface of a vehicle.

18. The curved display device of claim 17, wherein:
the curved display device is used as a vehicle instrument panel on a dashboard or a vehicle center console information display unit.

* * * * *